Patented Mar. 22, 1927.

1,621,502

UNITED STATES PATENT OFFICE.

SALY FREUND AND BERTRAM STAUFFER, OF NUREMBERG, GERMANY.

GOLDBEATER'S FOIL.

No Drawing. Application filed April 29, 1926, Serial No. 105,608, and in Germany March 16, 1925.

The present invention has reference to the gold-beater's art, and relates more specifically to an improvement over the well known gold-beater's skin of animal origin as conventionally used for beating precious and base metals. The use of these animal skins has several recognized disadvantages, chief among which is their high cost and the fact that in the course of their preparation they retain a certain fat content, which makes their immediate use for thin (shoder or mold) beating inadvisable, so that they must first be used repeatedly for thick (cutch) beating, before they can be effectively used for thin-beating.

These disadvantages are effectively overcome by our present invention. We use in place of the animal gut for interleaving the metal foils, foils formed of a cellulose hydrate, preferably cellophane. These foils, if desired, may be brushed or otherwise provided with any of the coating or "dope" preparations commonly employed as coatings for skin foils, consisting essentially of isinglass, gum arabic, tragacanth, shellac, and spices, such as saffron, cinnamon, and cloves in red wine. However, the cellophane foils may be used to advantage without such a coating.

The foils are very cheap and, being devoid of fat, they can immediately be employed for mold-beating; and they have the further advantage that their use reduces the beating time to a considerable degree, and the finished leaf product proves to be denser, more homogeneous, and of better lustre than if beaten in the old way between animal skins. The durability of these new foils, that is their resistance to the hammer blows, is at least equal, if not superior, to that of the animal skins.

We claim:

1. As a new article of manufacture, a gold-beater's foil formed of cellulose hydrate.

2. As a new article of manufacture, a gold-beater's foil formed of cellophane.

3. As a new article of manufacture, a gold-beater's foil formed of cellulose hydrate provided with a conventional gold-beater's skin coating.

4. A gold-beater's mold, comprising a plurality of interleaves, formed of foils of cellulose hydrate.

In testimony whereof we affix our signatures.

DR. SALY FREUND.
BERTRAM STAUFFER.